(12) United States Patent
Mamillapalli et al.

(10) Patent No.: US 11,150,973 B2
(45) Date of Patent: Oct. 19, 2021

(54) SELF DIAGNOSING DISTRIBUTED APPLIANCE

(71) Applicant: Cisco Technology, Inc., San Jose, CA (US)

(72) Inventors: Pavan Mamillapalli, San Ramon, CA (US); Shadab Nazar, Fremont, CA (US); Chetan Narsude, Sunnyvale, CA (US); Gaurav Gupta, Santa Clara, CA (US); Azeem Suleman, San Jose, CA (US); Jagdev Singh Tur, Manteca, CA (US); Navjyoti Sharma, Livermore, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 202 days.

(21) Appl. No.: 15/791,339

(22) Filed: Oct. 23, 2017

(65) Prior Publication Data

US 2018/0365096 A1    Dec. 20, 2018

Related U.S. Application Data

(60) Provisional application No. 62/521,070, filed on Jun. 16, 2017.

(51) Int. Cl.
G06F 11/00    (2006.01)
G06F 11/07    (2006.01)

(52) U.S. Cl.
CPC ...... *G06F 11/0778* (2013.01); *G06F 11/0709* (2013.01); *G06F 11/0751* (2013.01)

(58) Field of Classification Search
CPC ............ G06F 11/0763; G06F 11/3452; G06F 11/3604; G06F 11/008; G06F 11/079;
(Continued)

(56) References Cited

U.S. PATENT DOCUMENTS

| 5,204,829 A | 4/1993 | Lyu et al. |
| 6,763,380 B1 | 7/2004 | Mayton et al. |

(Continued)

FOREIGN PATENT DOCUMENTS

| CN | 105471830 | 4/2016 |
| CN | 105721193 | 6/2016 |

(Continued)

OTHER PUBLICATIONS

Akella, Aditya, et al., "A Highly Available Software Defined Fabric," HotNets-XIII, Oct. 27-28, 2014, Los Angeles, CA, USA, Copyright 2014, ACM, pp. 1-7.

(Continued)

*Primary Examiner* — Sarai E Butler
(74) *Attorney, Agent, or Firm* — Polsinelli

(57) ABSTRACT

Aspects of the technology provide methods for aggregating error log data between multiple devices in a network monitoring appliance. A method of the technology can include steps for identifying a plurality of operators running in a network monitoring appliance, instantiating a plurality of sensors, wherein each of the plurality of sensors is associated with a respective one of the plurality of operators, and wherein each sensor is configured to capture error log data of its corresponding operator. In some aspects, the method can further include steps for aggregating error log data from two or more of the plurality of sensors. Systems and machine-readable media are also provided.

20 Claims, 5 Drawing Sheets

(58) Field of Classification Search
CPC ......... G06F 11/3409; G06F 2212/1008; G06F 11/3476; G06F 11/3636; G06F 11/364; G06F 11/3466; G06F 11/0751; G06F 11/0766; G06F 11/0769; G06F 11/0772; G06F 11/0775; G06F 11/0778; G06F 11/0781; G06F 11/078; G06F 11/0787; G06F 11/08; G06F 11/14; G06F 11/1479; G06F 11/16; G06F 11/22; G05B 23/0283
USPC ..................................................... 714/1–57
See application file for complete search history.

(56) References Cited

U.S. PATENT DOCUMENTS

| | | | | |
|---|---|---|---|---|
| 6,993,683 | B2* | 1/2006 | Bhat | H04L 1/22 714/4.2 |
| 7,003,562 | B2 | 2/2006 | Mayer | |
| 7,089,369 | B2 | 8/2006 | Emberling | |
| 7,127,686 | B2 | 10/2006 | Dreschler et al. | |
| 7,360,064 | B1 | 4/2008 | Steiss et al. | |
| 7,453,886 | B1 | 11/2008 | Allan | |
| 7,505,463 | B2 | 3/2009 | Schuba et al. | |
| 7,548,967 | B2 | 6/2009 | Amyot et al. | |
| 7,552,201 | B2 | 6/2009 | Areddu et al. | |
| 7,609,647 | B2 | 10/2009 | Turk et al. | |
| 7,619,989 | B2 | 11/2009 | Guingo et al. | |
| 7,698,561 | B2 | 4/2010 | Nagendra et al. | |
| 7,743,274 | B2 | 6/2010 | Langford et al. | |
| 7,765,093 | B2 | 7/2010 | Li et al. | |
| 8,010,952 | B2 | 8/2011 | Datla et al. | |
| 8,073,935 | B2 | 12/2011 | Viswanath | |
| 8,103,480 | B2 | 1/2012 | Korn et al. | |
| 8,190,719 | B2 | 5/2012 | Furukawa | |
| 8,209,738 | B2 | 6/2012 | Nicol et al. | |
| 8,261,339 | B2 | 9/2012 | Aldridge et al. | |
| 8,312,261 | B2 | 11/2012 | Rao et al. | |
| 8,375,117 | B2 | 2/2013 | Venable, Sr. | |
| 8,441,941 | B2 | 5/2013 | McDade et al. | |
| 8,479,267 | B2 | 7/2013 | Donley et al. | |
| 8,484,693 | B2 | 7/2013 | Cox et al. | |
| 8,494,977 | B1 | 7/2013 | Yehuda et al. | |
| 8,554,883 | B2 | 10/2013 | Sankaran | |
| 8,589,934 | B2 | 11/2013 | Makljenovic et al. | |
| 8,621,284 | B2 | 12/2013 | Kato | |
| 8,627,328 | B2 | 1/2014 | Mousseau et al. | |
| 8,661,295 | B1* | 2/2014 | Khanna | H04L 67/125 714/43 |
| 8,693,344 | B1 | 4/2014 | Adams et al. | |
| 8,693,374 | B1 | 4/2014 | Murphy et al. | |
| 8,761,036 | B2 | 6/2014 | Fulton et al. | |
| 8,782,182 | B2 | 7/2014 | Chaturvedi et al. | |
| 8,824,482 | B2 | 9/2014 | Kajekar et al. | |
| 8,910,143 | B2 | 12/2014 | Cohen et al. | |
| 8,914,843 | B2 | 12/2014 | Bryan et al. | |
| 8,924,798 | B2 | 12/2014 | Jerde et al. | |
| 9,019,840 | B2 | 4/2015 | Salam et al. | |
| 9,037,922 | B1* | 5/2015 | Cabrera | G06F 11/3495 714/47.1 |
| 9,038,151 | B1 | 5/2015 | Chua et al. | |
| 9,055,000 | B1 | 6/2015 | Ghosh et al. | |
| 9,106,555 | B2 | 8/2015 | Agarwal et al. | |
| 9,137,096 | B1 | 9/2015 | Yehuda et al. | |
| 9,225,601 | B2 | 12/2015 | Khurshid et al. | |
| 9,246,818 | B2 | 1/2016 | Deshpande et al. | |
| 9,264,922 | B2 | 2/2016 | Gillot et al. | |
| 9,276,877 | B1 | 3/2016 | Chua et al. | |
| 9,319,300 | B2 | 4/2016 | Huynh Van et al. | |
| 9,344,348 | B2 | 5/2016 | Ivanov et al. | |
| 9,369,434 | B2 | 6/2016 | Kim et al. | |
| 9,389,993 | B1 | 7/2016 | Okmyanskiy et al. | |
| 9,405,553 | B2 | 8/2016 | Branson et al. | |
| 9,444,842 | B2 | 9/2016 | Porras et al. | |
| 9,497,207 | B2 | 11/2016 | Dhawan et al. | |
| 9,497,215 | B2 | 11/2016 | Vasseur et al. | |
| 9,544,224 | B2 | 1/2017 | Chu et al. | |
| 9,548,965 | B2 | 1/2017 | Wang et al. | |
| 9,553,845 | B1 | 1/2017 | Talmor et al. | |
| 9,571,502 | B2 | 2/2017 | Basso et al. | |
| 9,571,523 | B2 | 2/2017 | Porras et al. | |
| 9,594,640 | B1 | 3/2017 | Chheda | |
| 9,596,141 | B2 | 3/2017 | McDowall | |
| 9,641,249 | B2 | 5/2017 | Kaneriya et al. | |
| 9,654,300 | B2 | 5/2017 | Pani | |
| 9,654,361 | B2 | 5/2017 | Vasseur et al. | |
| 9,654,409 | B2 | 5/2017 | Yadav et al. | |
| 9,660,886 | B1 | 5/2017 | Ye et al. | |
| 9,660,897 | B1 | 5/2017 | Gredler | |
| 9,667,645 | B1 | 5/2017 | Belani et al. | |
| 9,674,249 | B1* | 6/2017 | Kekre | H04L 65/60 |
| 9,680,875 | B2 | 6/2017 | Knjazihhin et al. | |
| 9,686,180 | B2 | 6/2017 | Chu et al. | |
| 9,686,296 | B1 | 6/2017 | Murchison et al. | |
| 9,690,644 | B2 | 6/2017 | Anderson et al. | |
| 9,781,004 | B2 | 10/2017 | Danait et al. | |
| 9,787,559 | B1* | 10/2017 | Schroeder | |
| 9,998,247 | B1 | 6/2018 | Choudhury et al. | |
| 10,084,795 | B2 | 9/2018 | Akireddy et al. | |
| 10,084,833 | B2 | 9/2018 | McDonnell et al. | |
| 10,084,895 | B2 | 9/2018 | Kasat et al. | |
| 10,394,805 | B2* | 8/2019 | Warner | G06F 16/901 |
| 2001/0056492 | A1* | 12/2001 | Bressoud | H04L 29/06 709/227 |
| 2002/0143855 | A1 | 10/2002 | Traversat et al. | |
| 2002/0178246 | A1 | 11/2002 | Mayer | |
| 2003/0112232 | A1* | 6/2003 | Georgalas | G06F 9/541 345/418 |
| 2003/0229693 | A1 | 12/2003 | Mahlik et al. | |
| 2004/0073647 | A1 | 4/2004 | Gentile et al. | |
| 2004/0168100 | A1 | 8/2004 | Thottan et al. | |
| 2005/0108389 | A1 | 5/2005 | Kempin et al. | |
| 2005/0193281 | A1* | 9/2005 | Ide | H04L 69/40 714/4.1 |
| 2006/0225073 | A1* | 10/2006 | Akagawa | G06F 9/52 718/1 |
| 2007/0011629 | A1 | 1/2007 | Shacham et al. | |
| 2007/0074076 | A1* | 3/2007 | Imai | G06F 11/0709 714/26 |
| 2007/0124437 | A1 | 5/2007 | Chervets | |
| 2007/0214244 | A1 | 9/2007 | Hitokoto et al. | |
| 2008/0031147 | A1 | 2/2008 | Fieremans et al. | |
| 2008/0117827 | A1 | 5/2008 | Matsumoto et al. | |
| 2008/0133731 | A1 | 6/2008 | Bradley et al. | |
| 2008/0172716 | A1 | 7/2008 | Talpade et al. | |
| 2009/0240758 | A1 | 9/2009 | Pasko et al. | |
| 2009/0249284 | A1 | 10/2009 | Antosz et al. | |
| 2009/0265585 | A1* | 10/2009 | Ikegami | G06F 11/327 714/46 |
| 2009/0282281 | A1* | 11/2009 | Bull | G06F 9/3869 714/2 |
| 2010/0121975 | A1* | 5/2010 | Sinha | H04L 67/327 709/231 |
| 2010/0191612 | A1 | 7/2010 | Raleigh | |
| 2010/0198909 | A1 | 8/2010 | Kosbab et al. | |
| 2011/0093612 | A1 | 4/2011 | Murakami | |
| 2011/0131184 | A1* | 6/2011 | Kirshenbaum | G06F 11/1435 707/639 |
| 2011/0295983 | A1 | 12/2011 | Medved et al. | |
| 2012/0054163 | A1 | 3/2012 | Liu et al. | |
| 2012/0198073 | A1 | 8/2012 | Srikanth et al. | |
| 2012/0297061 | A1 | 11/2012 | Pedigo et al. | |
| 2013/0077517 | A1* | 3/2013 | Cho | H04L 43/50 370/252 |
| 2013/0097660 | A1 | 4/2013 | Das et al. | |
| 2013/0103972 | A1* | 4/2013 | Ozer | G06F 11/0727 714/2 |
| 2013/0191516 | A1 | 7/2013 | Sears | |
| 2014/0019597 | A1 | 1/2014 | Nath et al. | |
| 2014/0095864 | A1* | 4/2014 | Dasgupta | H04L 45/64 713/155 |
| 2014/0177638 | A1 | 6/2014 | Bragg et al. | |
| 2014/0222996 | A1 | 8/2014 | Vasseur et al. | |
| 2014/0304831 | A1 | 10/2014 | Hidlreth et al. | |

(56) References Cited

U.S. PATENT DOCUMENTS

| | | |
|---|---|---|
| 2014/0307556 A1 | 10/2014 | Zhang |
| 2014/0316926 A1* | 10/2014 | Gounares .......... G06Q 30/0611 705/26.4 |
| 2014/0321277 A1 | 10/2014 | Lynn, Jr. et al. |
| 2014/0379915 A1 | 12/2014 | Yang et al. |
| 2014/0380101 A1* | 12/2014 | Yu ...................... G06F 11/3636 714/38.1 |
| 2015/0006978 A1* | 1/2015 | Tokunaga .......... G06F 11/3034 714/55 |
| 2015/0019756 A1 | 1/2015 | Masuda |
| 2015/0113143 A1 | 4/2015 | Stuart et al. |
| 2015/0124826 A1 | 5/2015 | Edsall et al. |
| 2015/0161006 A1* | 6/2015 | Nakamizu .......... G06F 11/1405 714/15 |
| 2015/0186206 A1 | 7/2015 | Bhattacharya et al. |
| 2015/0234695 A1 | 8/2015 | Cuthbert et al. |
| 2015/0244617 A1 | 8/2015 | Nakil et al. |
| 2015/0271104 A1 | 9/2015 | Chikkamath et al. |
| 2015/0280968 A1* | 10/2015 | Gates ...................... G06F 11/30 714/37 |
| 2015/0280969 A1* | 10/2015 | Gates .................. G06F 11/3006 714/37 |
| 2015/0281011 A1* | 10/2015 | Gates .................... H04L 41/065 709/224 |
| 2015/0288558 A1* | 10/2015 | Gates .................. H04L 41/0686 714/57 |
| 2015/0289068 A1* | 10/2015 | Sundberg ............... H04R 25/60 381/323 |
| 2015/0295771 A1 | 10/2015 | Cuni et al. |
| 2015/0365314 A1 | 12/2015 | Hiscock et al. |
| 2015/0381484 A1 | 12/2015 | Hira et al. |
| 2016/0006779 A1* | 1/2016 | Zhou ................. G06F 16/24542 709/231 |
| 2016/0020993 A1 | 1/2016 | Wu et al. |
| 2016/0021141 A1 | 1/2016 | Liu et al. |
| 2016/0026631 A1 | 1/2016 | Salam et al. |
| 2016/0036636 A1 | 2/2016 | Erickson et al. |
| 2016/0048420 A1 | 2/2016 | Gourlay et al. |
| 2016/0078220 A1 | 3/2016 | Scharf et al. |
| 2016/0080350 A1 | 3/2016 | Chaturvedi et al. |
| 2016/0085772 A1* | 3/2016 | Vermeulen .............. G06F 16/21 707/615 |
| 2016/0099883 A1 | 4/2016 | Voit et al. |
| 2016/0105317 A1 | 4/2016 | Zimmermann et al. |
| 2016/0112246 A1 | 4/2016 | Singh et al. |
| 2016/0112269 A1 | 4/2016 | Singh et al. |
| 2016/0134495 A1* | 5/2016 | Banescu .................. H04L 43/04 709/224 |
| 2016/0149751 A1 | 5/2016 | Pani et al. |
| 2016/0164748 A1 | 6/2016 | Kim |
| 2016/0224277 A1 | 8/2016 | Batra et al. |
| 2016/0241436 A1 | 8/2016 | Fourie et al. |
| 2016/0254964 A1 | 9/2016 | Benc |
| 2016/0267384 A1 | 9/2016 | Salam et al. |
| 2016/0323319 A1 | 11/2016 | Gourlay et al. |
| 2016/0330076 A1 | 11/2016 | Tiwari et al. |
| 2016/0352566 A1 | 12/2016 | Mekkattuparamban et al. |
| 2016/0380892 A1 | 12/2016 | Mahadevan et al. |
| 2017/0026292 A1 | 1/2017 | Smith et al. |
| 2017/0031800 A1 | 2/2017 | Shani et al. |
| 2017/0031970 A1 | 2/2017 | Burk |
| 2017/0048110 A1 | 2/2017 | Wu et al. |
| 2017/0048126 A1 | 2/2017 | Handige Shankar et al. |
| 2017/0054758 A1 | 2/2017 | Maino et al. |
| 2017/0063599 A1 | 3/2017 | Wu et al. |
| 2017/0093630 A1 | 3/2017 | Foulkes |
| 2017/0093664 A1 | 3/2017 | Lynam et al. |
| 2017/0093750 A1 | 3/2017 | McBride et al. |
| 2017/0093918 A1 | 3/2017 | Banerjee et al. |
| 2017/0111259 A1 | 4/2017 | Wen et al. |
| 2017/0118167 A1 | 4/2017 | Subramanya et al. |
| 2017/0126740 A1 | 5/2017 | Bejarano Ardila et al. |
| 2017/0126792 A1 | 5/2017 | Halpern et al. |
| 2017/0134233 A1 | 5/2017 | Dong et al. |
| 2017/0163442 A1 | 6/2017 | Shen et al. |
| 2017/0187577 A1 | 6/2017 | Nevrekar et al. |
| 2017/0195187 A1 | 7/2017 | Bennett et al. |
| 2017/0206129 A1 | 7/2017 | Yankilevich et al. |
| 2017/0222873 A1 | 8/2017 | Lee et al. |
| 2018/0069754 A1 | 3/2018 | Dasu et al. |
| 2018/0114126 A1* | 4/2018 | Das ........................ G06F 16/35 |
| 2018/0167294 A1 | 6/2018 | Gupta et al. |
| 2018/0246776 A1* | 8/2018 | Auvenshine ........ G06F 11/3072 |
| 2018/0365092 A1* | 12/2018 | Linetskiy .............. G06F 11/079 |

FOREIGN PATENT DOCUMENTS

| | | |
|---|---|---|
| CN | 105721297 | 6/2016 |
| CN | 106130766 | 11/2016 |
| CN | 106603264 | 4/2017 |
| CN | 103701926 | 6/2017 |
| WO | WO 2015/014177 | 2/2015 |
| WO | WO 2015/187337 | 12/2015 |
| WO | WO 2016/011888 | 1/2016 |
| WO | WO 2016/039730 | 3/2016 |
| WO | WO 2016/072996 | 5/2016 |
| WO | WO 2016/085516 | 6/2016 |
| WO | WO 2016/093861 | 6/2016 |
| WO | WO 2016/119436 | 8/2016 |
| WO | WO 2016/130108 | 8/2016 |
| WO | WO 2016/161127 | 10/2016 |
| WO | WO 2017/031922 | 3/2017 |
| WO | WO 2017/039606 | 3/2017 |
| WO | WO 2017/105452 | 6/2017 |

OTHER PUBLICATIONS

Alsheikh, Mohammad Abu, et al., "Machine Learning in Wireless Sensor Networks: Algorithms, Strategies, and Application," Mar. 19, 2015, pp. 1-23.

Author Unknown, "Aids to Pro-active Management of Distributed Resources through Dynamic Fault-Localization and Availability Prognosis," FaultLocalization-TR01-CADlab, May 2006, pp. 1-9.

Author Unknown, "Requirements for applying formal methods to software-defined networking," Telecommunication Standardization Sector of ITU, Series Y: Global Information Infrastructure, Internet Protocol Aspects and Next-Generation Networks, Apr. 8, 2015, pp. 1-20.

Cisco, "Verify Contracts and Rules in the ACI Fabric," Cisco, Updated Aug. 19, 2016, Document ID: 119023, pp. 1-20.

De Silva et al., "Network-wide Security Analysis," Semantic Scholar, Oct. 25, 2011, pp. 1-11.

Dhawan, Mohan, et al., "SPHINX: Detecting Security Attacks in Software-Defined Networks," NDSS 2015, Feb. 8-11, 2015, San Diego, CA, USA, Copyright 2015 Internet Society, pp. 1-15.

Fayaz, Seyed K., et al., "Efficient Network Reachability Analysis using a Succinct Control Plane Representation," 2016, ratul.org, pp. 1-16.

Feldmann, Anja, et al., "IP Network Configuration for Intradomain Traffic Engineering," Semantic Scholar, accessed on Jul. 20, 2017, pp. 1-27.

Han, Yoonseon, et al., "An Intent-based Network Virtualization Platform for SDN," 2016 I FIP, pp. 1-6.

Han, Wonkyu, et al., "LPM: Layered Policy Management for Software-Defined Networks," Mar. 8, 2016, pp. 1-8.

Kazemian, Peyman, et al., "Real Time Network Policy Checking using Header Space Analysis," USENIX Association, 10th USENIX Symposium on Networked Systems Design and Implementation (NSDI '13) pp. 99-111.

Khatkar, Pankaj Kumar, "Firewall Rule Set Analysis and Visualization, A Thesis Presented in Partial Fulfillment of the Requirements for the Degree Master of Science," Arizona State University, Dec. 2014, pp. 1-58.

Le, Franck, et al., "Minerals: Using Data Mining to Detect Router Misconfigurations," CyLab, Carnegie Mellon University, CMU-CyLab-06-008, May 23, 2006, pp. 1-14.

Liang, Chieh-Jan Mike, et al., "SIFT: Building an Internet of Safe Things," Microsoft, IPSN' 15, Apr. 14-16, 2015, Seattle, WA, ACM 978, pp. 1-12.

(56) References Cited

OTHER PUBLICATIONS

Lindem, A., et al., "Network Device YANG Organizational Model draft-rtgyangdt-rtgwg-device-model-01," Network Working Group, Internet-draft, Sep. 21, 2015, pp. 1-33.

Liu, Jason, et al., "A Real-Time Network Simulation Infrastructure Based on Open VPN," Journal of Systems and Software, Aug. 4, 2008, pp. 1-45.

Lopes, Nuno P., et al., "Automatically verifying reachability and well-formedness in P4 Networks," Microsoft, accessed on Jul. 18, 2017, pp. 1-13.

Mai, Haohui, et al., "Debugging the Data Plane with Anteater," SIGCOMM11, Aug. 15-19, 2011, pp. 1-12.

Miller, Nancy, et al., "Collecting Network Status Information for Network-Aware Applications," INFOCOM 2000, pp. 1-10.

Moon, Daekyeong, et al., "Bridging the Software/Hardware Forwarding Divide," Berkeley.edu, Dec. 18, 2010, pp. 1-15.

Panda, Aurojit, et al., "SCL: Simplifying Distributed SDN Control Planes," people.eecs.berkeley.edu, Mar. 2017, pp. 1-17.

Shin, Seugwon, et al., "FRESCO: Modular Composable Security Services for Software-Defined Networks," To appear in the ISOC Network and Distributed System Security Symposium, Feb. 2013, pp. 1-16.

Shukla, Apoorv, et al., "Towards meticulous data plane monitoring," kaust.edu.sa, access on Aug. 1, 2017, pp. 1-2.

Tang, Yongning, et al., "Automatic belief network modeling via policy inference for SDN fault localization," Journal of Internet Services and Applications, 2016, pp. 1-13.

Tomar, Kuldeep, et al., "Enhancing Network Security and Performance Using Optimized ACLs," International Journal in Foundations of Computer Science & Technology (IJFCST), vol. 4, No. 6, Nov. 2014, pp. 25-35.

Tongaonkar, Alok, et al., "Inferring Higher Level Policies from Firewall Rules," Proceedings of the 21st Large Installation System Administration Conference (LISA '07), Nov. 11-16, 2007, pp. 1-14.

Zhou, Shijie, et al., "High-Performance Packet Classification on GPU," 2014 IEEE, pp. 1-6.

Cisco Systems, Inc., "Cisco Application Centric Infrastructure 9AC1 Endpoint Groups (EPG) Usange and Design," White Paper, May 2014, pp. 1-14.

Cisco Systems, Inc., "The Cisco Application Policy Infrastructure Controller Introduction: What is the Cisco Application Policy Infrastructure Controller?" Jul. 31, 2014, 19 pages.

Jain, Praveen, et al., "In-Line Distributed and Stateful Security Policies for Applications in a Network Environment," Cisco Systems, Inc., Aug. 16, 2016, 13 pages.

Maldonado-Lopez, Ferney, et al., "Detection and prevention of firewall—rule conflicts on software-defined networking," 2015 $7^{th}$ International Workshop on Reliable Networks Design and Modeling (RNDM), IEEE, Oct. 5, 2015, pp. 259-265.

Vega, Andres, et al., "Troubleshooting Cisco Application Centric Infrastructure: Analytical problem solving applied to the Policy Driven Data Center," Feb. 15, 2016, 84 pages.

Xia, Wenfeng, et al., "A Survey on Software-Defined Networking," IEEE Communications Surveys and Tutorials, Mar. 16, 2015, pp. 27-51.

Yu et al., "A Flexible Framework for Wireless-Based Intelligent Sensor with Reconfigurability, Dynamic adding, and Web interface," Conference Paper, Jul. 24, 2006 https://www.researchgate.net/publication/4246055, IEEE 2006, pp. 1-7.

\* cited by examiner

SELF DIAGNOSING DISTRIBUTED APPLIANCE

CROSS-REFERENCE TO RELATED APPLICATIONS

This application claims the benefit of U.S. Application No. 62/521,070, filed Jun. 16, 2017, entitled "SELF DIAGNOSING DISTRIBUTED APPLIANCE", which is incorporated by reference in its entirety.

BACKGROUND

1. Technical Field

The present technology pertains to network configuration and troubleshooting, and more specifically to systems and methods for correlating error log data of independent operators deployed in a network monitoring appliance.

2. Introduction

Network configurations for large data center networks are often specified at a centralized controller. The controller can realize the intent in the network by programming switches and routers in the data center according to the specified network configurations. Network configurations are inherently very complex, and involve low level as well as high level configurations of several layers of the network such as access policies, forwarding policies, routing policies, security policies, QoS policies, etc. Given such complexity, the network configuration process is error prone.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
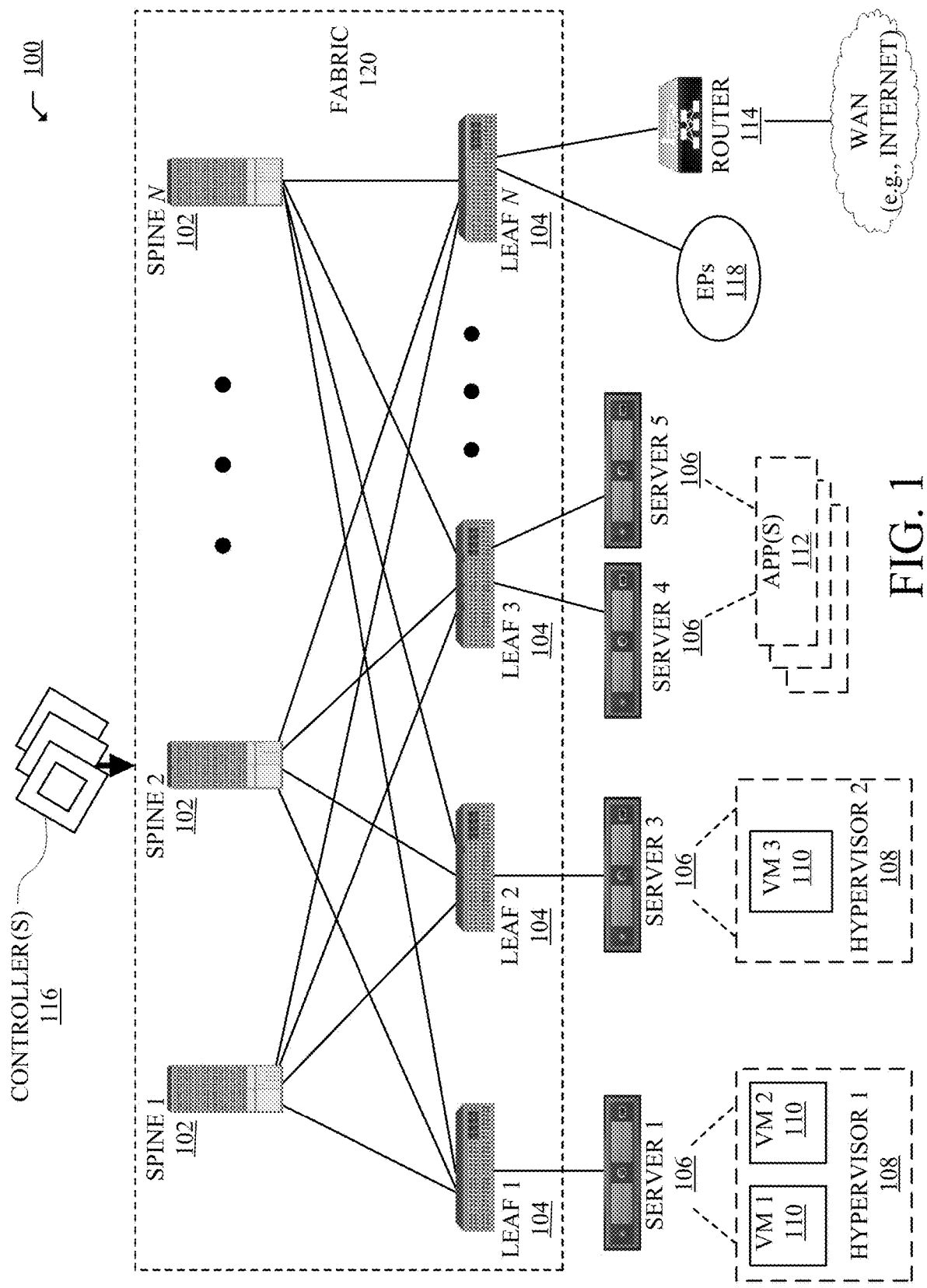
FIG. 1 illustrates an example network environment in which some aspects of the technology can be implemented.

The detailed description set forth below is intended as a description of various configurations of the disclosed technology and is not intended to represent the only configurations in which the technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview:

In conventional networking appliances, each network component (e.g. switch, router, server, virtual machine, or container, etc.), can be configured to generate and store its own error logs. Error logs provide data regarding various states of the component and/or network before a time of component failure.

One limitation of conventional appliances is that the error logs generated by each component are independent from one another, and provide no information with which to correlate errors across different logs. Because each error log can be updated continuously, they can grow to contain vast amounts of information. As a result, using multiple error logs to diagnose network failure events can prove complicated and time-consuming. Additionally, as the number of network components increases, the difficulty of error troubleshooting scales proportionally.

Description:

Aspects of the subject technology address the foregoing limitations by providing systems and methods for correlating error logs between network components, and in particular, operators in a network monitoring appliance. Error log aggregation is facilitated by sensors associated with each network component (or application), and configured to report and correlate error log data from other network components in the system.

In some aspects, an individual sensor is configured to collect error log data for an associated network component (operator) within discrete time periods, for example, identified by a "time ID" or "window ID." Grouping/correlating error log data based on time ID enables a network administrator to conveniently troubleshoot network failure events, for example, by selecting and displaying error log data for each network component at (or around) a time when failure occurred. As used herein, an application or operator that is associated with a sensor can be provided as a hardware-based or software-based (virtual device). In some typical operations, multiple operators may be organized in a serial configuration (e.g., a pipeline) that is configured to perform some processing task, e.g., with respect to tenant network monitoring. As such, a pipeline of network operators may include physical devices (e.g., routers or switches), and/or virtual devices (software routines) that are instantiated as part of a virtual machine (VM), or network container.

FIG. 1, which illustrates a diagram of an example network environment 100, such as a data center. Network 100 can include a Fabric 120 that can represent the physical layer or infrastructure (e.g., underlay) of the network 100. Fabric 120 can include Spines 102 (e.g., spine routers or switches) and Leafs 104 (e.g., leaf routers or switches) which can be interconnected for routing traffic in the Fabric 120. The Spines 102 can interconnect the Leafs 104 in the Fabric 120, and the Leafs 104 can connect the Fabric 120 to the overlay portion of the network 100, which can include application services, servers, virtual machines, containers, endpoints, etc. Thus, network connectivity in the Fabric 120 can flow from Spines 102 to Leafs 104, and vice versa. Leafs 104 can be, for example, top-of-rack ("ToR") switches, aggregation switches, gateways, ingress and/or egress switches, provider edge devices, and/or any other type of routing or switching device.

Leafs 104 can be responsible for routing and/or bridging tenant or customer packets and applying network policies. Network policies can be driven by the one or more controllers 116 and/or the Leafs 104. The Leafs 104 can connect Servers 106, Hypervisors 108, Virtual Machines (VMs) 110, Applications 112, Endpoints 118, External Routers 114, etc., with the Fabric 120. For example, Leafs 104 can encapsulate and decapsulate packets to and from Servers 106 in order to enable communications throughout the network 100, including the Fabric 120. Leafs 104 can also provide any other devices, services, tenants, or workloads with access to the Fabric 120.

Applications 112 can include software applications, services, operators, containers, appliances, functions, service chains, etc. For example, Applications 112 can include a firewall, a database, a CDN server, an IDS/IPS, a deep packet inspection service, a message router, a virtual switch, etc. VMs 110 can be virtual machines hosted by Hypervisors 108 running on Servers 106. VMs 110 can include workloads running on a guest operating system on a respective server. Hypervisors 108 can provide a layer of software, firmware, and/or hardware that creates and runs the VMs 110. Hypervisors 108 can allow VMs 110 to share hardware resources on Servers 106, and the hardware resources on Servers 106 to appear as multiple, separate hardware platforms. Moreover, Hypervisors 108 on Servers 106 can each host one or more VMs 110.

In some cases, VMs 110 and/or Hypervisors 108 can be migrated to other Servers 106. Servers 106 can similarly be migrated to other locations in the network environment 100. For example, a server connected to a specific leaf can be changed to connect to a different or additional leaf. Such configuration or deployment changes can involve modifications to settings and policies that are applied to the resources being migrated.

In some cases, one or more Servers 106, Hypervisors 108, and/or VMs 110 can represent a tenant or customer space. Tenant space can include workloads, services, applications, devices, and/or resources that are associated with one or more clients or subscribers. Accordingly, traffic in the network environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, and configuration information between tenants can be managed by one or more controllers 116.

Policies, configurations, settings, etc., in the network can be implemented at the application level, the physical level, and/or both. For example, one or more controllers 116 can define a policy model at the application level which defines policies and other settings for groups of applications or services, such as endpoint groups. In some addition, the Leafs 104, as well as other physical devices such as physical servers or Spines 102, can apply specific policies to traffic. For example, Leafs 104 can apply specific policies or contracts to traffic based on tags or characteristics of the traffic, such as protocols associated with the traffic, applications or endpoint groups associated with the traffic, network address information associated with the traffic, etc.

In some examples, network 100 can be configured according to a particular software-defined network (SDN) solution. The network 100 can deploy one or more SDN solutions, such as CISCO Application Centric Infrastructure (ACI) or VMWARE NSX solutions. These example SDN solutions are briefly described below.

Application Centric Infrastructure (ACI) is an example SDN solution that can be implemented in network 100. ACI can provide an application policy-based solution through scalable distributed enforcement. ACI supports integration of physical and virtual environments under a declarative policy model for networks, servers, services, security, requirements, etc. For example, the ACI framework implements End Point Groups (EPGs), which can include a collection of endpoints or applications that share common policy requirements, such as security, QoS, services, etc. Endpoints can be virtual/logical or physical devices, such as VMs and bare-metal physical servers that are connected to the network 100. Endpoints can have one or more attributes such as VM name, guest OS name, a security tag, etc. Application policies can be applied between EPGs, instead of endpoints directly, in the form of contracts. The Leafs 104 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, and physical hosts. For example, an AVS can classify traffic based on specified attributes, and tag packets of different attribute EPGs with different identifiers, such as network segment identifiers (e.g., VLAN ID). Finally, Leafs 104 can tie packets with their attribute EPGs based on their identifiers and enforce policies, which can be implemented and/or managed by one or more controllers 116, such as an application policy infrastructure controller (APIC). The Leaf 104 can classify to which EPG the traffic from a host belong and enforce policies accordingly.

Another example SDN solution is based on VMWare NSX. With VMWare NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, from our previous example, DFW rules can be configured to block HTTP traffic between web, application, and database security groups.

Network 100 may deploy different hosts via the Leafs 104, Servers 106, Hypervisors 108, VMs 110, Applications 112, Controllers 116, and/or Endpoints 118, such as VMware ESXi hosts, Windows Hyper-V hosts, bare metal physical hosts, etc. The network 100 may interoperate with a wide variety of Hypervisors 108, Servers 106 (e.g., physical and/or virtual servers), SDN orchestration platforms, etc.

The network 100 may implement a declarative model to allow its integration with application design and holistic network policy.

One or more controllers 116 can provide centralized access to fabric information, application configuration, resource configuration, application-level policy modeling for a software-defined network (SDN) infrastructure, integration with management systems or servers, etc. The one or more controllers 116 can form a control plane that interfaces with an application plane via northbound APIs and a data plane via southbound APIs. In some examples, the one or more controllers 116 can include SDN controllers or managers, such as an application policy infrastructure controller (APIC) or a vCenter NSX Manager.

Controllers 116 can define and manage application-level model(s) for policies in the network 100. In some cases, application or device policies can also be managed and/or defined by other components in the network. For example, a hypervisor or virtual appliance, such as a VM or container, can run a server or management tool to manage software and services in the network 100, including policies and settings for virtual appliances.

As referenced herein, the term "hosts" can refer to servers 106 (e.g., physical or logical), Hypervisors 108, VMs 110, containers (e.g., Applications 112), EPs 118, etc., and can run or include any type of server or application solution. Non-limiting examples of "hosts" can include DVS virtual servers, vCenter and NSX Managers, bare metal physical hosts, AVS hosts, Hyper-V hosts, VMs, Docker Containers, Virtual Routers/Switches (e.g., VPP), etc.

Figure 2:
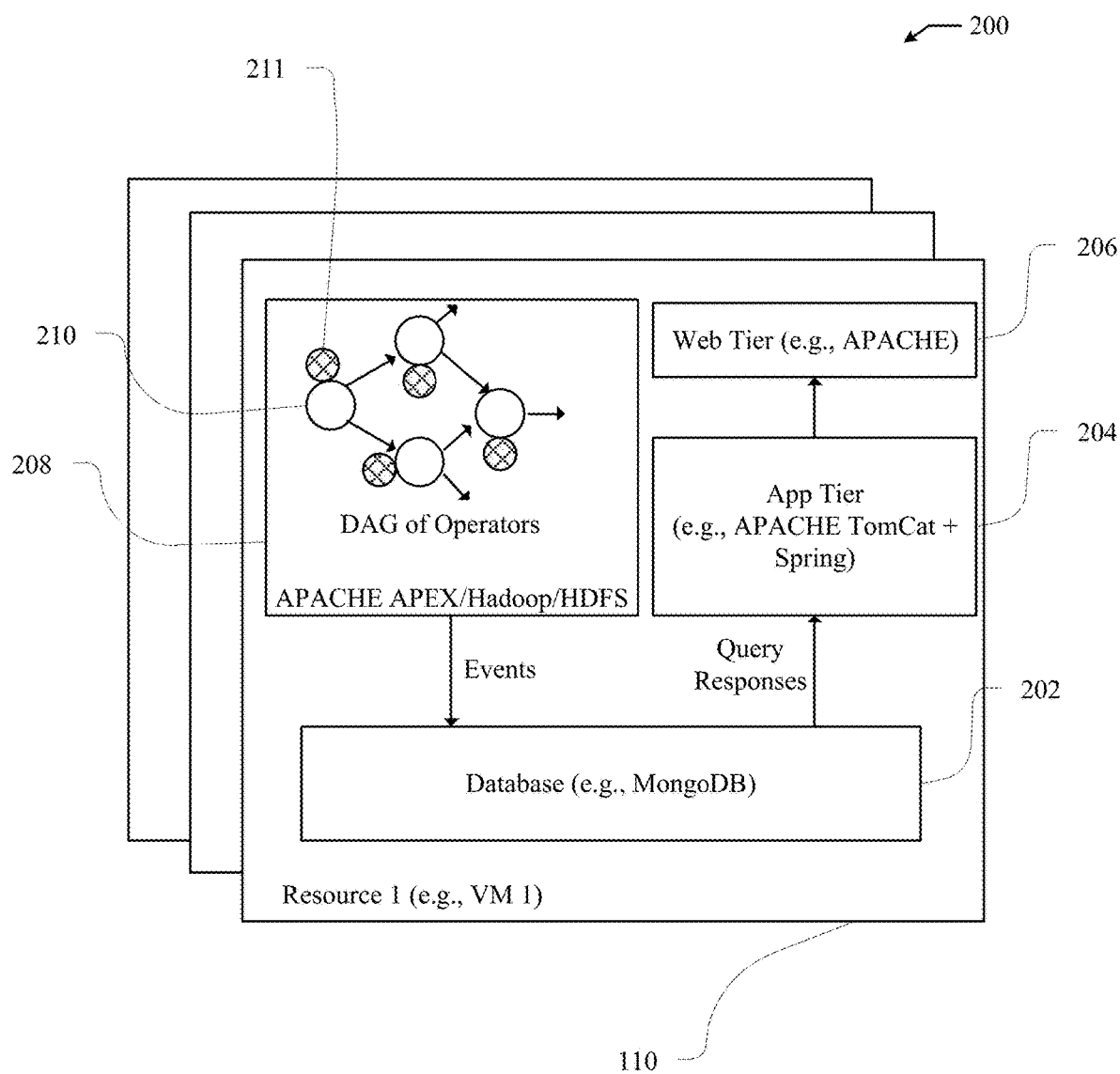
FIG. 2 illustrates an example network assurance appliance, according to some aspects of the technology.

FIG. 2 illustrates a diagram of an example Assurance Appliance 200 for network assurance. In this example, Appliance 200 can include k VMs 110 operating in cluster mode. VMs are used in this example for explanation purposes. However, it should be understood that other configurations are also contemplated herein, such as use of containers, bare metal devices, Endpoints 122, or any other physical or logical systems. Moreover, while FIG. 2 illustrates a cluster mode configuration, other configurations are also contemplated herein, such as a single mode configuration (e.g., single VM, container, or server) or a service chain for example.

Appliance 200 can run on one or more Servers 106, VMs 110, Hypervisors 108, EPs 122, Leafs 104, Controllers 116, or any other system or resource. For example, Assurance Appliance 200 can be a logical service or application running on one or more VMs 110 in Network Environment 100.

Appliance 200 can include Data Framework 208, which can be based on, for example, APACHE APEX or HADOOP file system (e.g., HDFS). In some cases, assurance checks can be written as individual operators that reside in Data Framework 208. This enables a natively horizontal scale-out architecture that can scale to arbitrary number of switches in Fabric 120 (e.g., ACI fabric).

Appliance 200 can poll Fabric 120 at a configurable periodicity (e.g., an epoch). The analysis workflow can be setup as a DAG (Directed Acyclic Graph) of Operators 210, where data flows from one operator to another and eventually results are generated and persisted to Database 202 for each interval (e.g., each epoch).

Operators 210 in Data Framework 208 (e.g., APEX/Hadoop) can together support assurance operations. Because of the sequential nature of processing performed by operators 210, failure of an operator may generate errors in one or more downstream operators, making determinations of network error difficult.

In practice, operators 210 are each associated with a corresponding sensor 211 that functions to offload error-log data, for example, to a remote network device, such as a controller (e.g., controller/s 116), or to a database (e.g., database 202). Processing performed by any given operator can proceed within discrete time periods that can be identified with a time-stamp (e.g., a "window identification" or "window ID") that is attached to the error log data. As such, error log data that is aggregated by the network controller (i.e., potentially received from multiple different operators), can be easily correlated based on timestamp, to help troubleshoot the network failure event.

By way of example, incomplete or erroneous processing performed by one operator may result in a critical failure of one or more downstream operators. Using error log data reported by sensors 211, and correlated based on timestamp (e.g., Window ID), causal associations between failure of different operators 210 may be easily identified. For example, a critical failure of a downstream operator may be easily identified with an upstream operator based on error log data reported by a corresponding sensor 211 just prior to the critical failure. In some aspects, aggregated error log data reported by one or more sensors can be searched (e.g., by a system administrator), based on a timestamp input or Window ID.

Error log data can be reported by sensors in response to the satisfaction of one or more pre-conditions. For example, sensor reporting of operator error-log data can be performed at regular time intervals (e.g., 5-10 times per epoch), or may be reported based on changes in the network topology. By way of example, sensor error-log reporting may occur in response to a detected change in one or more operators, or in one or more other network devices for example, in a tenant network being monitored. In some aspects, the aggregation of error-log data from one or more of the sensors is performed in response to a detected network failure event, such as the failure of a switch, router, or other process in the network. In other aspects the aggregation of error-log data from one or more of the sensors is performed in response to a detected change in network topology of a monitored tenant network, the detected change in network topology consisting of one or more of: instantiation of a new virtual machine (VM), or instantiation of a new network container.

It is understood that appliance 200 can perform other types of assurance operations using operators 210. Below are non-limiting examples of assurance operations that can be performed by Assurance Appliance 200 via Operators 210.

Security Policy Adherence:

Assurance Appliance 200 can check to make sure the configurations or specification that reflect a user's (e.g., administrator's) intent for the network, including for example the security policies and customer-configured contracts, are correctly implemented and/or rendered, and thus properly implemented and rendered by the fabric members (e.g., Leafs 104), and report any errors, contract violations, or irregularities found.

Static Policy Analysis:

Assurance Appliance 200 can check for issues in the specification of the user's intent or intents (e.g., identify contradictory or conflicting policies).

TCAM Utilization:

Ternary Content-Addressable Memory (TCAM) is a scarce resource in the fabric (e.g., Fabric 120). However, Assurance Appliance 200 can analyze the TCAM utilization by the network data (e.g., Longest Prefix Match (LPM) tables, routing tables, VLAN tables, BGP updates, etc.), Contracts, Logical Groups 118 (e.g., EPGs), Tenants, Spines 102, Leafs 104, and other dimensions in Network Environment 100 and/or objects in MIM 200, to provide a network operator or user visibility into the utilization of this scarce resource. This can greatly help for planning and other optimization purposes.

Endpoint Checks:

In some aspects, assurance Appliance 200 can validate that the fabric (e.g. fabric 120) has no inconsistencies in the Endpoint information registered (e.g., two leafs announcing the same endpoint, duplicate subnets, etc.), among other such checks.

Tenant Routing/Forwarding Checks:

Assurance Appliance 200 can validate that BDs, VRFs, subnets (both internal and external), VLANs, contracts, filters, applications, EPGs, etc., are correctly programmed.

Infrastructure Routing:

Assurance Appliance 200 can validate that infrastructure routing (e.g., IS-IS protocol) has no convergence issues leading to black holes, loops, flaps, and other problems.

MP-BGP Route Reflection Checks:

The network fabric (e.g., Fabric 120) can interface with other external networks and provide connectivity to them via one or more protocols, such as Border Gateway Protocol (BGP), Open Shortest Path First (OSPF), etc. The learned routes are advertised within the network fabric via, for example, MP-BGP. These checks can ensure that a route reflection service via, for example, MP-BGP (e.g., from Border Leaf) does not have health issues.

Figure 3:
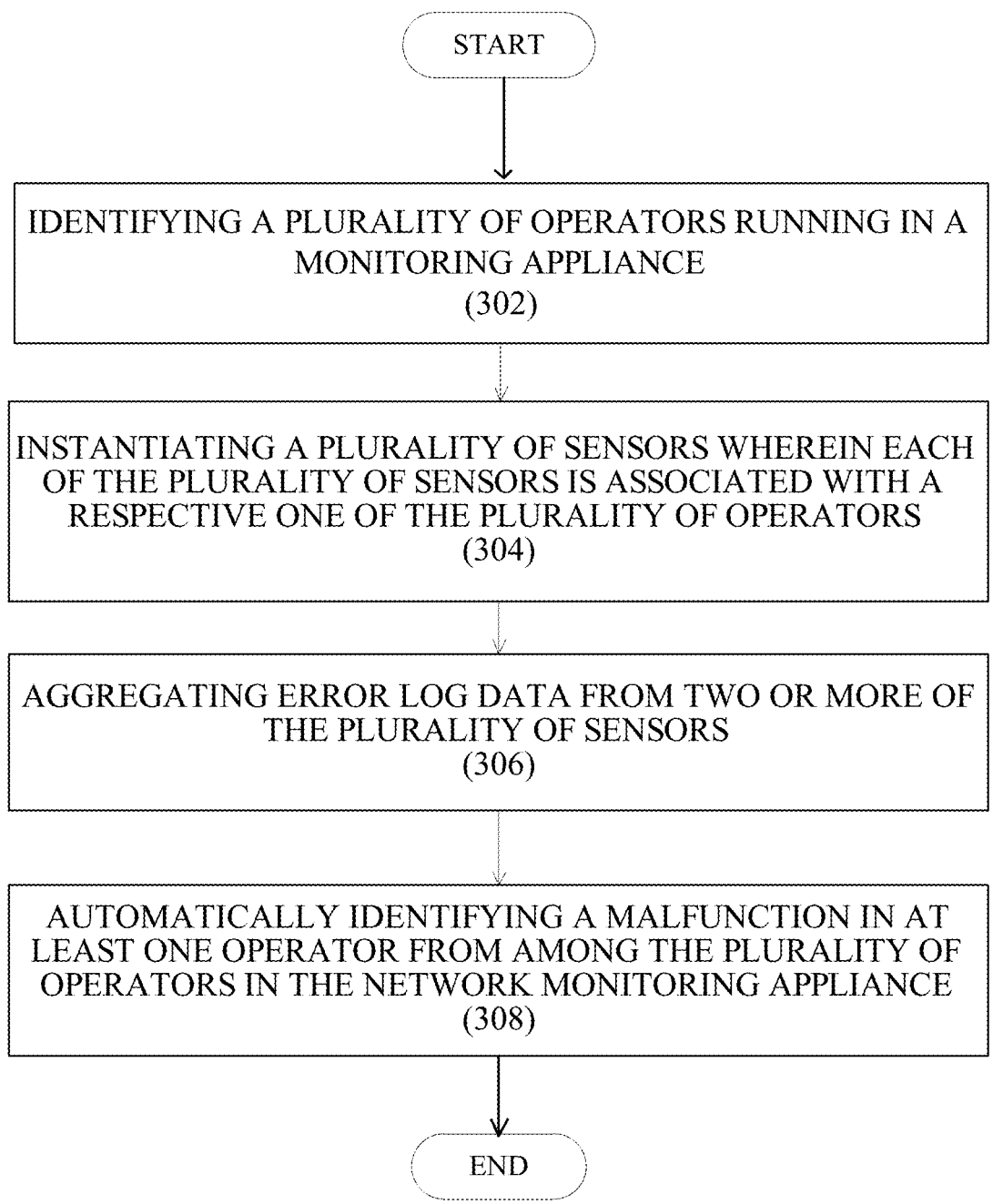
FIG. 3 illustrates steps of an example process for aggregating error log data from a variety of independent operators, according to some aspects of the technology.

FIG. 3 illustrates steps of an example process 300 for simulating network error events at a tenant network, according to some aspects of the technology. Process 300 begins with step 302 in which multiple operators running in a monitoring appliance are identified (e.g., by a network controller). Further to the examples discussed above with respect to FIG. 2, the operators may be processes supported by various network devices, such as VMs or network containers, and which are configured to provide a processing pipeline used to monitor a tenant network.

In step 304, sensors are instantiated at one or more operators. Sensor instantiation can be performed by a network administration device, such as a network controller. In other aspects, the sensors may be configured to be part of the operator function, such that the sensors are automatically brought online once a given operator is executed.

In step 306, error log data is aggregated from two or more of the sensors, for example, by a network controller. Error log data may be automatically received by a network controller, for example, at pre-determined time intervals. Error-log aggregation may be performed in response to the occurrence of a conditional event, such as, detected changes in network topology (e.g., starting/stopping of a virtual machine or container), or in response to the failure of a network device or operator in the DAG, etc.

As discussed above, error-log data reported by the sensors can be associated with a time stamp, or other temporal indicator (e.g., Window ID). As such, error-log data relayed by each sensor can be correlated such that error events from different operators in the network may be easily analyzed.

In step 308, the aggregated error-log data may be used to automatically identify a malfunction in at least one operator. In some instances, the network controller may analyze the aggregated error-log data to identify failure events occurring in one or more operators at a point in time that precedes a failure event for a network device, for example, in a tenant network and/or in the monitoring appliance.

Figure 4:
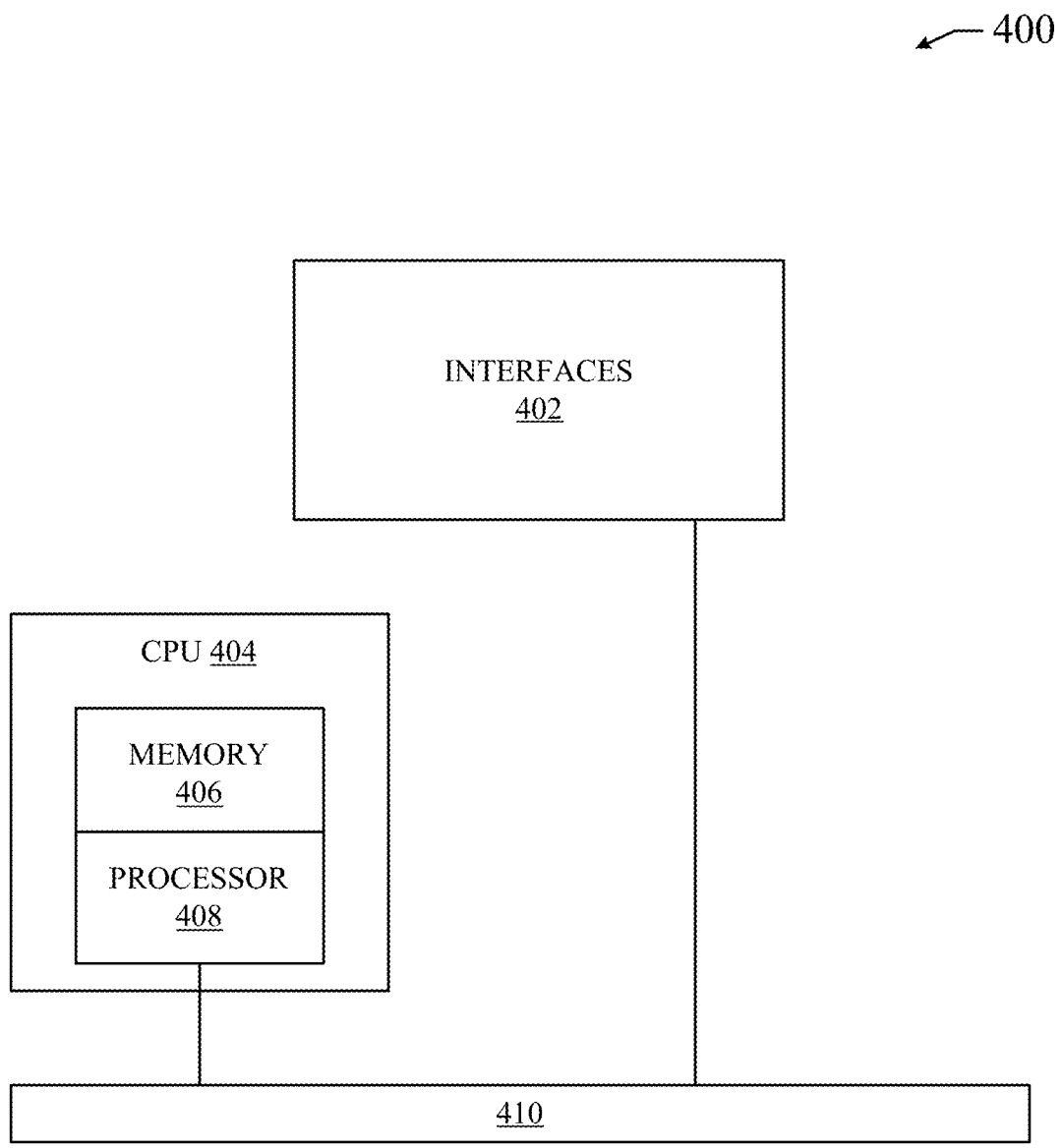
FIG. 4 illustrates an example network device in accordance with various embodiments.

FIG. 4 illustrates an example network device 400 suitable for implementing a network appliance of the subject technology. Network device 400 includes a central processing unit (CPU) 404, interfaces 402, and a bus 410 (e.g., a PCI bus). When acting under the control of appropriate software or firmware, the CPU 404 is responsible for executing packet management, error detection, and/or routing functions. CPU 404 accomplishes all these functions under the control of software including an operating system and any appropriate applications software. CPU 404 may include one or more processors 408, such as a processor from the INTEL X86 family of microprocessors. In some cases, processor 408 can be specially designed hardware for controlling the operations of network device 400. In some cases, a memory 406 (e.g., non-volatile RAM, ROM, etc.) also forms part of CPU 404. However, there are many different ways in which memory could be coupled to the system.

The interfaces 402 are typically provided as modular interface cards (sometimes referred to as "line cards"). They can control the sending and receiving of data packets over the network and sometimes support other peripherals used with the network device 400. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 404 to efficiently perform routing computations, network diagnostics, security functions, etc.

Although the system shown in FIG. 4 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 400.

Regardless of the network device's configuration, it may employ one or more memories or memory modules (including memory 406) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 406 could also hold various software containers and virtualized execution environments and data.

In some implementations, the program instructions may be configured to cause CPU 404 and/or processor 408 to perform operations for simulating failure events in a tenant network. In particular, the program instructions can cause CUP 404 and/or processor 408 to perform operations for identifying, by a network controller, a plurality of operators running in a network monitoring appliance, instantiating, by the network controller, a plurality of sensors, wherein each of the plurality of sensors is associated with a respective one of the plurality of operators, and wherein each sensor is configured to capture error log data of its corresponding operator, and aggregating, by the network controller, error log data from two or more of the plurality of sensors. In some aspects, a method of the disclosed technology may further include steps for automatically identifying, by the controller, a malfunction in at least one operator from among the plurality of operators in the network monitoring appliance. In some aspects, the error log data may be aggregated from the two or more of the plurality of sensors provides information regarding a malfunction in a tenant network coupled to the network monitoring appliance.

Network device 400 can also include an application-specific integrated circuit (ASIC), which can be configured to perform routing and/or switching operations. The ASIC can communicate with other components in the network device 400 via the bus 410, to exchange data and signals and coordinate various types of operations by the network device 400, such as routing, switching, and/or data storage operations, for example.

Figure 5:
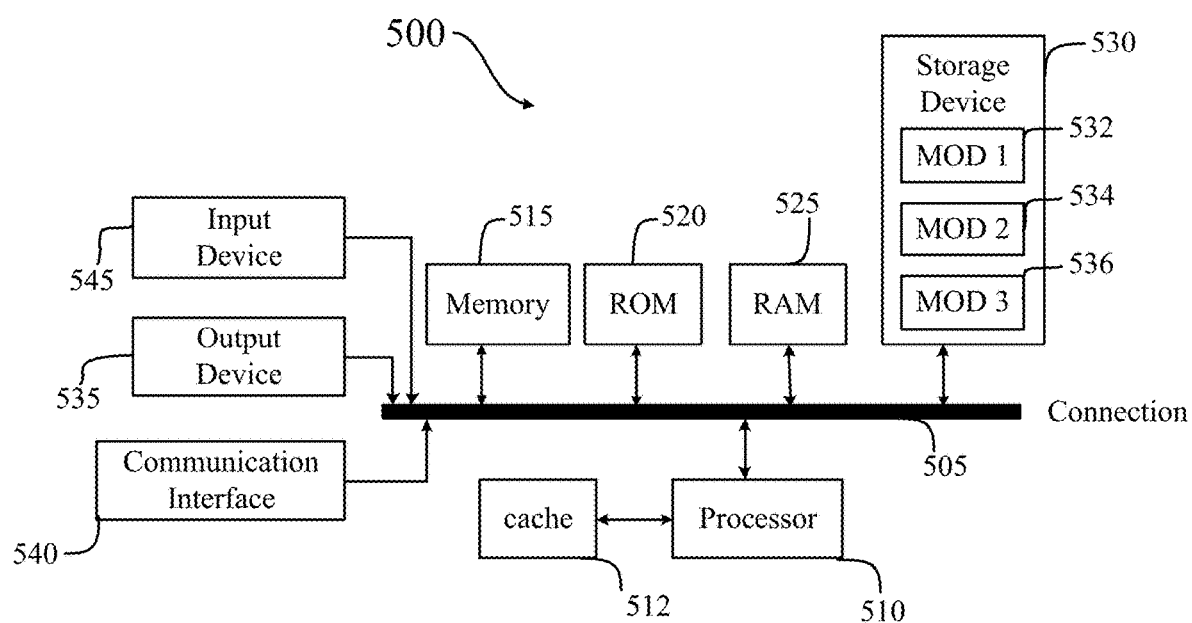
FIG. 5 illustrates an example computing device in accordance with various embodiments.

FIG. 5 illustrates a computing architecture 500 wherein the components of the system are in electrical communication with each other via connection 505, such as a bus. System 500 includes a processing unit (CPU or processor) 510 and a system connection 505 that couples various system components including system memory 515, such as read only memory (ROM) 520 and random access memory (RAM) 525, to processor 510. System 500 can include a cache of high-speed memory connected directly with, in close proximity to, or integrated as part of the processor 510. The system 500 can copy data from the memory 515 and/or the storage device 530 to the cache 512 for quick access by processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware or software service, such as service 1 532, service 2 534, and service 3 536 stored in storage device 530, configured to control the processor 510 as well as a special-purpose processor where software instructions are incorporated into the actual processor design. The processor 510 may be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include services 532, 534, 536 for controlling the processor 510. Other hardware or software modules are contemplated. Storage device 530 can be connected to the system connection 505. In one aspect, a hardware module that performs a particular function can include the software component stored in a computer-readable medium in connection with the necessary hardware components, such as the processor 510, connection 505, output device 535, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions.

Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
identifying, by a network controller, a plurality of operators running in a network monitoring appliance, wherein each operator comprises a respective process in a processing pipeline of the network monitoring appliance, and wherein the plurality of operators provide the processing pipeline of the network monitoring appliance;
instantiating, by the network controller, a plurality of sensors at the network monitoring appliance, wherein the plurality of sensors comprises a respective sensor instantiated for each respective operator of the plurality of operators, wherein each respective sensor captures log data of its respective operator and wherein at least a portion of log data captured and aggregated by the plurality of sensors including two or more errors from a set of sequential operations of the processing pipeline, based on a window identification indicating a processing time of the network monitoring appliance, performed by the plurality of operators running in the network monitoring appliance;
determining, by the network controller, a directed acyclic graph representing an analysis workflow for the processing pipeline of the network monitoring appliance, wherein each node of the directed acyclic graph represents a different one of the plurality of operators, and wherein each edge of the directed acyclic graph represents a flow of data along the processing pipeline of the network monitoring appliance; and
identifying, by the network controller, a malfunction in at least one operator comprising the respective process in the processing pipeline of the network monitoring appliance by analyzing the log data in the aggregated log data, according to the analysis workflow represented by the directed acyclic graph, wherein the malfunction comprises at least one of a first error in a first configuration setting implemented by the at least one operator or a second error in a second configuration setting defined for the at least one operator.

2. The computer-implemented method of claim 1, wherein the malfunction comprises an inconsistency between one or more configuration settings as configured in the network controller and the one or more configuration settings as implemented by the at least one operator and the network monitoring.

3. The computer-implemented method of claim 2, wherein the one or more configuration settings comprise one or more network policies associated with the at least one operator.

4. The computer-implemented method of claim 1, further comprising:
generating aggregated log data at predetermined time intervals.

5. The computer-implemented method of claim 1, wherein the processing pipeline is configured to perform an overall processing task associated with the plurality of operators, the plurality of operators being organized in a serial configuration associated with the processing pipeline.

6. The computer-implemented method of claim 1, wherein at least one of the plurality of sensors is configured to report the log data of its respective operator in response to a detected change in a network topology of a monitored network, wherein the log data from each respective sensor is aggregated in response to at least one of the detected change in the network topology or an error event associated with the malfunction in the at least one operator.

7. The computer-implemented method of claim 1, wherein each edge of the directed acyclic graph further represents a group policy between a pair of operators.

8. A system comprising:
one or more processors;
a network interface coupled to the one or more processors; and
a computer-readable medium coupled to the one or more processors, the computer-readable medium comprising instructions stored therein, which when executed by the one or more processors, cause the system to:
identify a plurality of operators running in a network monitoring appliance, wherein each operator comprises a respective process in a processing pipeline of the network monitoring appliance, and wherein the plurality of operators provide the processing pipeline of the network monitoring appliance;
instantiate a plurality of sensors at the network monitoring appliance, wherein the plurality of sensors comprises a respective sensor instantiated for each respective operator of the plurality of operators,
wherein each respective sensor captures log data of its respective operator and wherein at least a portion of log data captured and aggregated by the plurality of sensors including two or more errors from a set of sequential operations of the processing pipeline, based on a window identification indicating a processing time of the network monitoring appliance, performed by the plurality of operators running in the network monitoring appliance;
determine a directed acyclic graph representing an analysis workflow for the processing pipeline of the network monitoring appliance, wherein each node of the directed acyclic graph represents a different one of the plurality of operators, and wherein each edge of the directed acyclic graph represents a flow of data along the processing pipeline of the network monitoring appliance; and
identify a malfunction in at least one operator comprising the respective processing in the processing pipeline of the network monitoring appliance by analyzing the log, data in the aggregated log data according to the analysis workflow represented by the directed acyclic graph, wherein the malfunction comprises at least one of a first error in a first configuration setting implemented by the at least one operator or a second error in a second configuration setting defined for the at least one operator.

9. The system of claim 8, wherein the malfunction comprises an inconsistency between one or more configuration settings as configured in the network controller and the one or more configuration settings as implemented by the at least one operator and the network monitoring appliance.

10. The system of claim 9, wherein one or more configuration settings comprise one or more network policies associated with the at least one operator.

11. The system of claim 8, wherein the instructions are further configured to cause the system to:
    generating aggregated log data at predetermined time intervals.

12. The system of claim 8, wherein the processing pipeline is configured to perform an overall processing task associated with the plurality of operators, the plurality of operators being organized in a serial configuration associated with the processing pipeline.

13. The system of claim 8, wherein at least one of the plurality of sensors is configured to report the log data of its respective operator in response to a detected change in a network topology of a monitored network, wherein the log data from each respective sensor is aggregated in response to at least one of the detected change in the network topology or an error event associated with the malfunction in the at least one operator, the detected change comprising one or more of: instantiation of a new virtual machine (VM), or instantiation of a new network container.

14. The system of claim 8, wherein each edge of the directed acyclic graph further represents a service-level group policy between a pair of operators.

15. A non-transitory computer-readable storage medium comprising instructions stored therein, which when executed by one or more processors, cause a network controller to:
    identify a plurality of operators running in a network monitoring appliance, wherein each operator comprises a respective process in a processing pipeline of the network monitoring appliance, and wherein the plurality of operators provide the processing pipeline of the network monitoring appliance;
    instantiate a plurality of sensors at the network monitoring appliance, wherein the plurality of sensors comprises a respective sensor instantiated for each respective operator of the plurality of operators, wherein each respective sensor captures log data of its respective operator and wherein at least a portion of log data captured and aggregated by the plurality of sensors including two or more errors from a set of sequential operations of the processing pipeline, based on a window identification indicating a processing time of the network monitoring appliance, performed by the plurality of operators running in the network monitoring appliance;
    determine a directed acyclic graph representing an analysis workflow for the processing pipeline of the network monitoring appliance, wherein each node of the directed acyclic graph represents a different one of the plurality of operators, and wherein each edge of the directed acyclic graph represents a flow of data along the processing pipeline of the network monitoring appliance; an
    identify a malfunction in at least one operator comprising the respective processing in the processing pipeline of the network monitoring appliance by analyzing the log data in the aggregated log data according to the analysis workflow represented by the directed acyclic graph, wherein the malfunction comprises at least one of a first error in a first configuration setting implemented by the at least one operator or a second error in a second configuration setting defined for the at least one operator.

16. The non-transitory computer-readable storage medium of claim 15, wherein the malfunction comprises an inconsistency between one or more configuration settings as configured in the network controller and the one or more configuration settings as implemented by the at least one operator and the network monitoring appliance.

17. The non-transitory computer-readable storage medium of claim 16, wherein the one or more configuration settings comprise one or more network policies associated with the at least one operator.

18. The non-transitory computer-readable storage medium of claim 15, wherein the instructions are further configured to cause the network controller to:
    generating aggregated log data at predetermined time intervals.

19. The non-transitory computer-readable storage medium of claim 15, wherein the processing pipeline is configured to perform an overall processing task associated with the plurality of operators, the plurality of operators being organized in a serial configuration associated with the processing pipeline.

20. The non-transitory computer-readable storage medium of claim 15, wherein at least one of the plurality of sensors is configured to report the log data of its respective operator in response to a detected change in a network topology of a monitored network, wherein the log data from each respective sensor is aggregated in response to at least one of the detected change in the network topology or an error event associated with the malfunction in the at least one operator.

* * * * *